US008712853B2

(12) United States Patent
Iizaka et al.

(10) Patent No.: US 8,712,853 B2
(45) Date of Patent: Apr. 29, 2014

(54) CODE READING APPARATUS, SALES REGISTERING APPARATUS, AND SALES REGISTERING METHOD

(75) Inventors: Hitoshi Iizaka, Shizuoka (JP); Yoshiya Yamada, Shizuoka (JP); Hidemi Mihara, Shizuoka (JP); Hidehiro Naito, Shizuoka (JP); Osamu Tsuchiya, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 453 days.

(21) Appl. No.: 13/078,126

(22) Filed: Apr. 1, 2011

(65) Prior Publication Data

US 2011/0243446 A1 Oct. 6, 2011

(30) Foreign Application Priority Data

Apr. 2, 2010 (JP) ................................. 2010-086482

(51) Int. Cl.
*G06Q 20/00* (2012.01)
*G06Q 20/20* (2012.01)
*G06Q 30/02* (2012.01)

(52) U.S. Cl.
CPC .............. *G06Q 20/20* (2013.01); *G06Q 20/201* (2013.01); *G06Q 30/0207* (2013.01)
USPC ............................... 705/16; 705/20; 705/14.1

(58) Field of Classification Search
None
See application file for complete search history.

(56) References Cited

FOREIGN PATENT DOCUMENTS

| JP | 2002-215998 A | * | 8/2002 | ............. G06Q 10/00 |
|---|---|---|---|---|
| JP | 2003-187335 | | 7/2003 | |
| JP | 2007-272585 | * | 10/2007 | ............... G07G 1/12 |
| JP | 2008-033640 | | 2/2008 | |
| JP | 2009-015661 | | 1/2009 | |
| JP | 2009-289286 | | 12/2009 | |

OTHER PUBLICATIONS

Japanese Office Action for Japanese Application No. 2010-086482 mailed on Mar. 21, 2012.

* cited by examiner

*Primary Examiner* — Ryan Zeender
*Assistant Examiner* — Denisse Ortiz Roman
(74) *Attorney, Agent, or Firm* — Amin, Turocy & Watson, LLP

(57) ABSTRACT

According to one embodiment, a code reading apparatus includes a commodity-information reading unit, a commodity-information output unit, a benefit-information reading unit, and a benefit-information output unit. The commodity-information reading unit reads commodity information from a code symbol attached to a commodity. The commodity-information output unit outputs the commodity information read by the commodity-information reading unit. The benefit-information reading unit detects an image of benefit indication from an image imaged by an imaging unit and reads benefit information corresponding to the benefit indication from the detected image. The benefit-information output unit outputs the benefit information read by the benefit-information reading unit.

7 Claims, 14 Drawing Sheets

| No | LABEL CHARACTERISTIC DATA | BENEFIT INFORMATION |
|---|---|---|
| 1 | 0.5, US$, OFF | -US$ 0.5 |
| 2 | 10, %, DISCOUNT | -10% |
| 3 | 10, POINT | +10P |
| ⋮ | ⋮ | ⋮ |

| J1 | J2 | J3 | J4 | J5 | J6 | J7 | J8 | J9 | J10 | J11 | J12 | J13 C1 |

FIG.12

| P1 | P2 | P3 | P4 | P5 | P6 | P7 | P8 | P9 | P10 | P11 | P12 | P13 C2 |

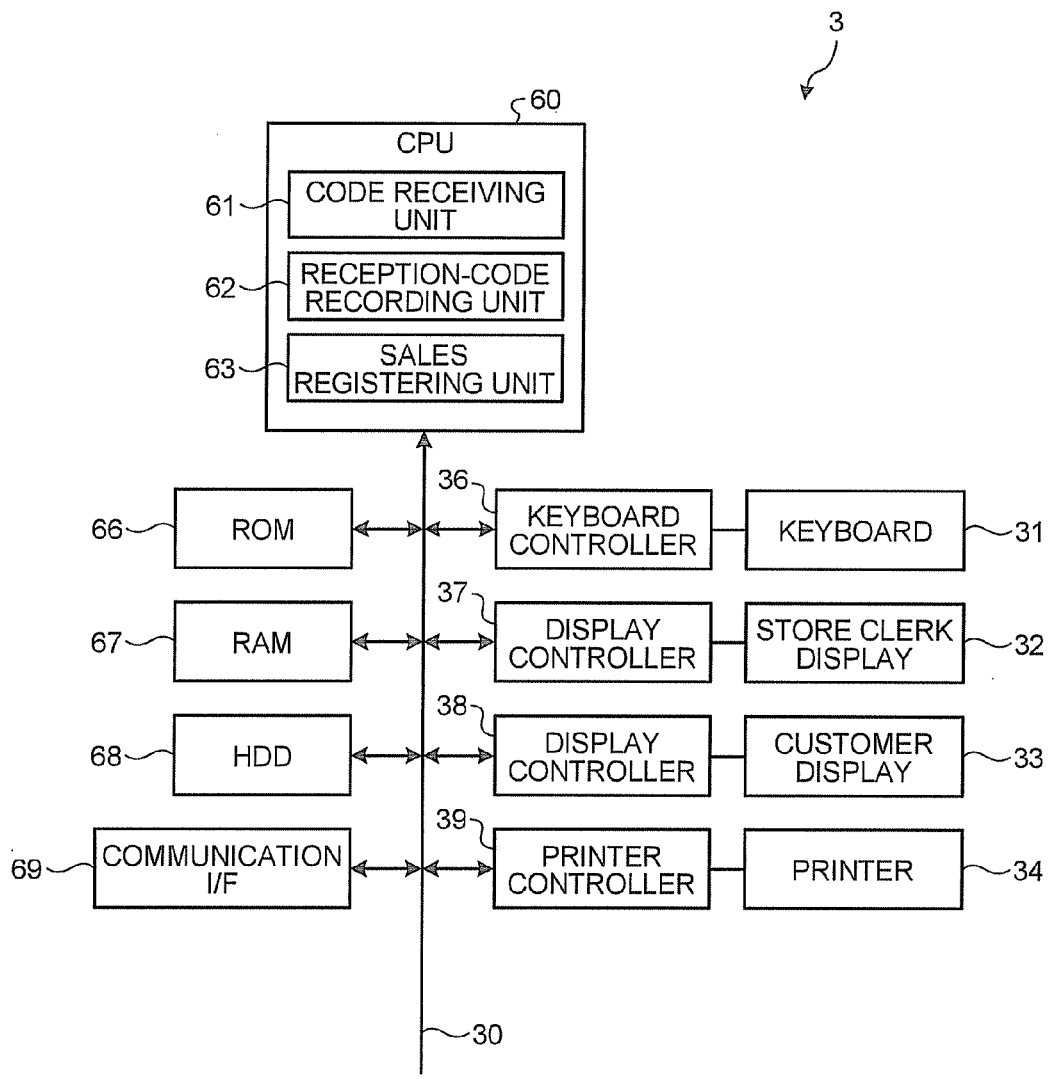

CODE READING APPARATUS, SALES REGISTERING APPARATUS, AND SALES REGISTERING METHOD

CROSS-REFERENCE TO RELATED APPLICATION

This application is based upon and claims the benefit of priority from the prior Japanese Patent Application No. 2010-086482, filed on Apr. 2, 2010; the entire contents of which are incorporated herein by reference.

FIELD

Embodiments described herein relate generally to a code reading apparatus, a sales registering apparatus, and a sales registering method.

BACKGROUND

In the past, in a retail store such as a supermarket, when the closing time approaches, commodities are often sold at cut prices in order to reduce disposal losses of perishables. In this case, the store attaches price-cut labels that indicate price-cut amounts, discount rates, and the like to commodities to clearly inform customers that the commodities are price-cut commodities. If a price-cut label is attached to a commodity that a customer is about to purchase, an operator of a POS (Point of Sales) terminal reads a barcode of the commodity with a scanner and performs processing concerning a price cut from a keyboard, a touch panel, or the like. Therefore, it is likely that the operator sells a price-cut commodity at a normal price without noticing a price-cut label.

To cope with such a problem, JP-A-2008-33640 discloses a technique for simultaneously imaging a barcode and a price-cut label with a camera and outputting a commodity code and price-cut information read from an imaged image to a POS terminal to automatically perform price-cut processing in the POS terminal.

In the technique disclosed in JP-A-2008-33640, since the price-cut label and the barcode are imaged at a time, it is necessary to attach the price-cut label near the barcode. However, since the price-cut label is often manually attached by a store clerk, in some cases, the positions of the barcode and the price-cut label are apart from each other. In such a case, the camera cannot image the barcode and the price-cut label at a time. Therefore, the price-cut processing cannot be automatically performed. An operator performs the price-cut processing by manually inputting the commodity code and the price-cut information from a keyboard or the like.

The present invention has been devised in view of the above and provides a code reading apparatus, a sales registering apparatus, and a sales registering method that can automatically perform benefit granting processing such as price-cut processing or point granting processing without requiring processing operation by an operator.

DESCRIPTION OF THE DRAWINGS

FIG. 11 is a diagram for explaining barcode data;

FIG. 12 is a diagram for explaining a benefit code;

FIG. 13 is a block diagram of the configuration of a POS terminal;

FIG. 14 is a diagram for explaining a reception record;

DETAILED DESCRIPTION

In general, according to one embodiment, a code reading apparatus includes a commodity-information reading unit, a commodity-information output unit, a benefit-information reading unit, and a benefit-information output unit. The commodity-information reading unit reads commodity information from a code symbol attached to a commodity. The commodity-information output unit outputs the commodity information read by the commodity-information reading unit. The benefit-information reading unit detects an image of benefit indication from an image imaged by an imaging unit and reads benefit information corresponding to the benefit indication from the detected image. The benefit-information output unit outputs the benefit information read by the benefit-information reading unit.

In general, according to another embodiment, a sales registering apparatus includes a receiving unit and a sales registering unit. The receiving unit receives commodity information read from a code symbol attached to a commodity and benefit information read from an image of benefit indication imaged by an imaging unit. The sales registering unit applies a benefit indicated by the benefit information to the commodity information received by the receiving unit and performs sales registration for the commodity.

In general, according to still another embodiment, a sales registering method is a sales registering method performed in a sales registering apparatus, the method including: receiving commodity information read from a code symbol attached to a commodity and benefit information read from an image of benefit indication imaged by an imaging unit; and applying a benefit indicated by the benefit information to the received commodity information and performing sales registration for the commodity.

First Embodiment

Figure 1:
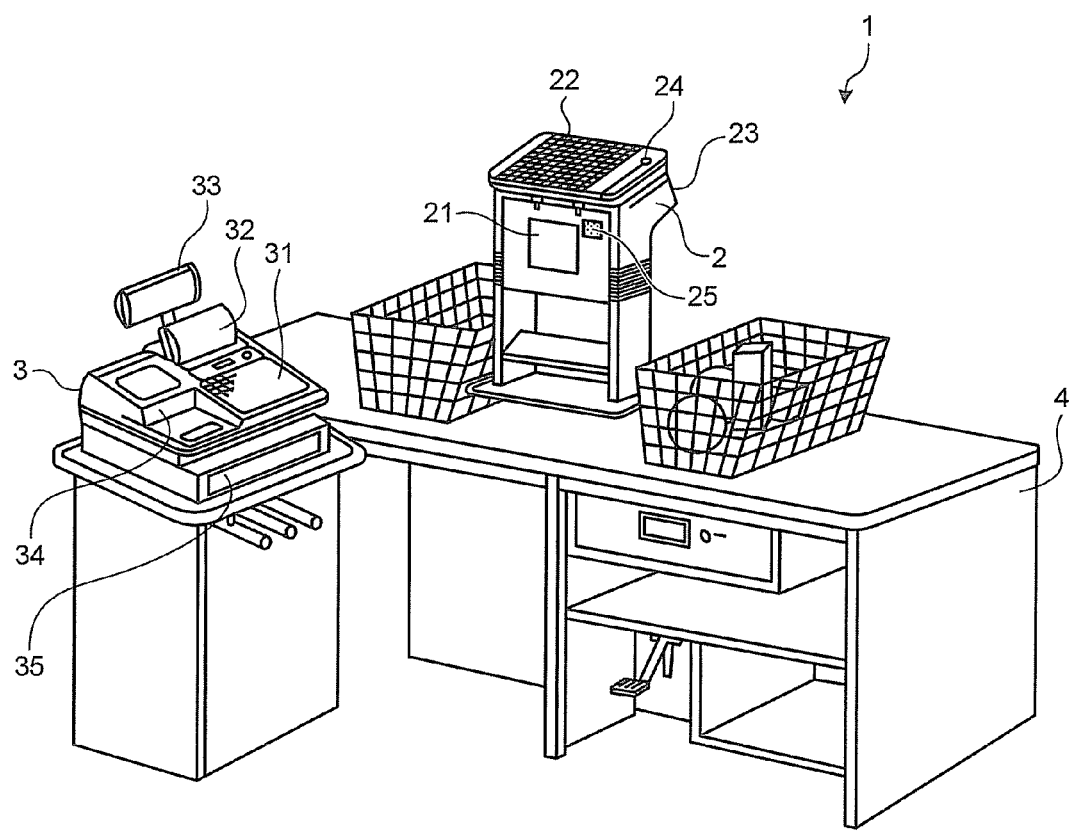
FIG. 1 is a schematic external perspective view of the configuration of a checkout lane system according to a first embodiment.

FIG. 1 is a schematic external perspective view of the configuration of a checkout lane system 1 according to a first embodiment. As shown in FIG. 1, the checkout lane system 1 includes a sucker table 4 for placing a shopping basket including commodities and a code reading apparatus 2 vertically provided substantially in the center of the sucker table 4. The checkout lane system 1 also includes a POS terminal 3 serving as a sales registering apparatus connected to the code reading apparatus 2 by a not-shown transmission line to be capable of communicating with each other.

The code reading apparatus 2 is an apparatus for reading a barcode attached to a commodity and outputting commodity information included in the barcode to the POS terminal 3. As shown in FIG. 1, the code reading apparatus 2 mainly includes a reading window 21, a keyboard 22, a display 23, a display LED 24, and a buzzer 25. The keyboard 22 receives an input by various keys if registration of a commodity unable to be registered by a barcode is performed. The display 23 displays a name, a price, and the like of a registered commodity to a customer. The display LED 24 is turned on if a barcode attached to a commodity is read and informs an operator that the barcode is read. The buzzer 25 sounds if a barcode or the like attached to a commodity is read and informs the operator that the barcode of the like is read. A CCD (Charge Coupled Device) camera 20 (see FIG. 2) is incorporated on the inside of the code reading apparatus 2 including the reading window 21.

The POS terminal 3 performs sales registration for a commodity to be purchased by a customer. As shown in FIG. 1, the POS terminal 3 includes a keyboard 31, a store clerk display 32, a customer display 33, a printer 34 configured to perform printing of a receipt and the like, and a drawer 35 for storing cash and the like. A commodity registration screen for displaying a commodity name, a price, and the like to be subjected to the sales registration is displayed on the store clerk display 32. A cash total key and the like for declaring closing processing for one transaction are disposed on the keyboard 31.

Figure 2:
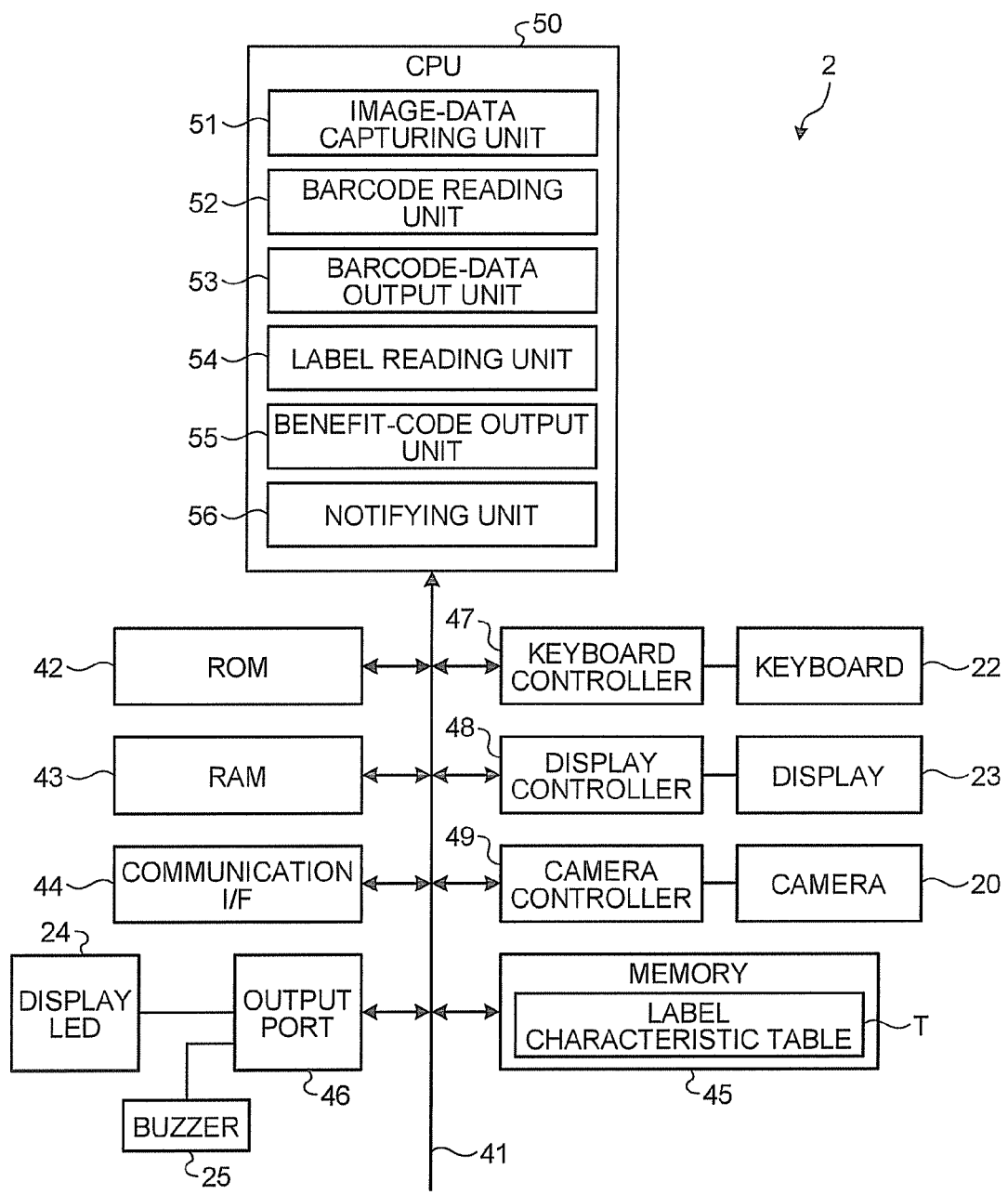
FIG. 2 is a block diagram of the configuration of a code reading apparatus.

The configuration of the code reading apparatus 2 is explained more in detail. FIG. 2 is a block diagram of the configuration of the code reading apparatus 2. The code reading apparatus 2 mainly includes a CPU 50, a ROM 42, a RAM 43, a communication I/F 44, an output port 46, a keyboard controller 47, a display controller 48, a camera controller 49, and a memory 45. These devices are connected by a bus line 41 such as an address bus or a data bus.

The CPU 50 functions as a control unit configured to control the overall operation of the code reading apparatus 2. The ROM 42 has stored therein various computer programs and the like executed by the CPU 50. The RAM 43 functions as a work area when the various computer programs stored in the ROM 42 are expanded by the CPU 50. The RAM 43 stores various data such as image data imaged by the camera 20.

The communication I/F 44 controls data communication with the POS terminal 3 (see FIG. 1) connected to the code reading apparatus 2 by a bus. The output port 46 outputs a driving signal to the buzzer 25 and the display LED 24. The keyboard controller 47 captures a key signal from the keyboard 22. The display controller 48 controls data display on the display 23. The camera controller 49 controls an imaging operation of the camera 20.

The camera 20 images, for example, a code symbol such as a barcode or a two-dimensional code attached to a commodity and a benefit indication label that indicates a benefit such as a price cut or point addition.

Figure 3:
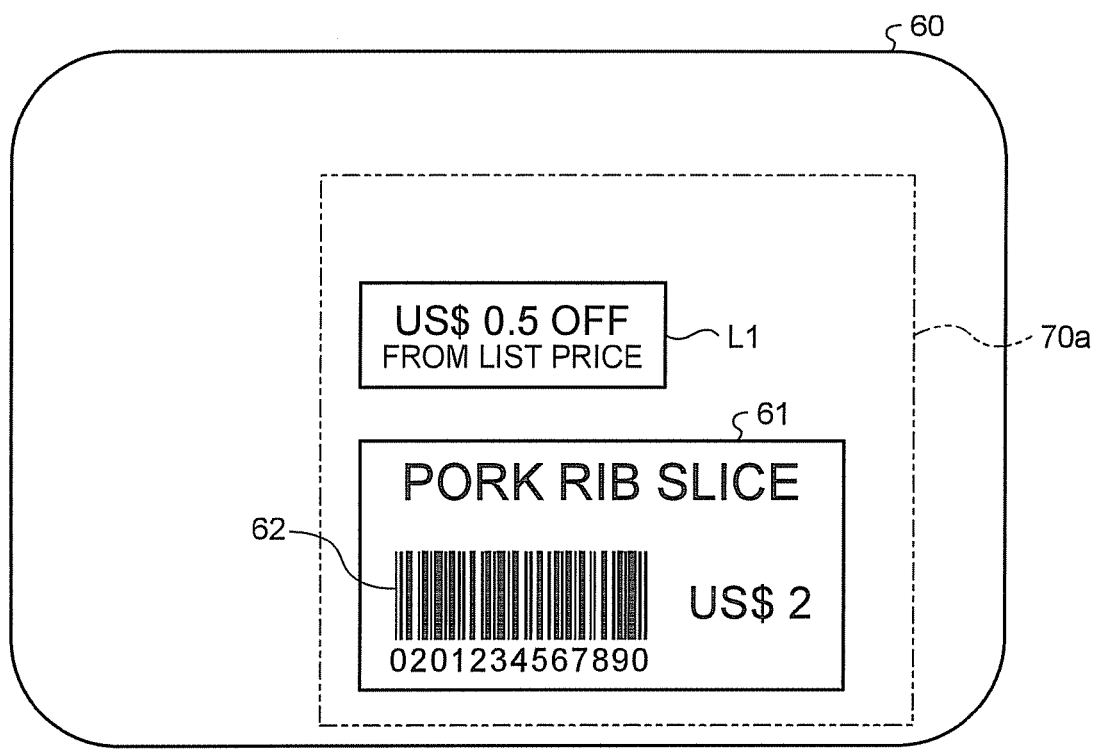
FIG. 3 is a diagram for explaining an example of a relation between a commodity and an imaging area of a camera.

A relation between a commodity processed by the code reading apparatus 2 according to this embodiment and an imaging area of the camera 20 is explained below. FIG. 3 is a diagram of an example of a relation between a commodity 60 and an imaging area of the camera 20. An area surrounded by an alternate long and two short dashes line in the figure is an imaging area 70a that is an area that the camera 20 can image in one frame. A price-cut label L1, which is an example of a benefit indication label, is attached to the commodity 60 shown in FIG. 3 in addition to a barcode label 61.

A commodity name "pork rib slice", a commodity price "US$ 2", a barcode 62, and the like are indicated on the barcode label 61. Information such as a commodity code is incorporated in the barcode 62 as commodity information necessary for subjecting sales data of the commodity 60 to registration processing in the POS terminal 3. A commodity code "0201234567890" incorporated in the barcode 62 is indicated as a number under the barcode 62. Character information "US$ 0.5 off from list price" that indicates a price-cut amount concerning the commodity 60 is indicated on the price-cut label L1.

Figure 4:
FIG. 4 is a diagram of a discount label.
Figure 5:
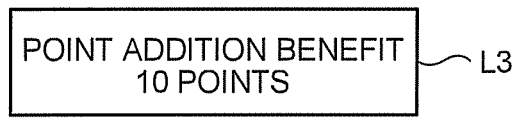
FIG. 5 is a diagram of a point addition label.

The benefit indication label only has to be a label that is attached to the commodity 60 and indicates an image concerning a benefit granted when the commodity 60 is purchased (an image of benefit indication). Other examples of the benefit indication label include a discount label L2 that indicates a discount rate of the commodity 60 as shown in FIG. 4 and a point addition label L3 that indicates the number of points granted to a customer, who purchases the commodity 60, in addition to a normal number of granted points as shown in FIG. 5.

The nonvolatile memory 45 stores a label characteristic table T that associates characteristics of benefit indication labels and contents of benefits indicated by the benefit indication labels.

Figures 6, 7:
FIG. 6 is a diagram for explaining a label characteristic table.
FIG. 7 is a diagram of image data including a barcode label and a price-cut label.

FIG. 6 is a diagram for explaining the label characteristic table T. As shown in FIG. 6, the label characteristic table T stores label characteristic data, which indicates characteristics of characters and symbols included in benefit indication labels, and benefit information, which is given to commodities by the benefit indication labels, in association with each other.

More specifically, the label characteristic data refers to information extracted from the benefit indication label by character recognition processing by an OCR or the like. Concerning the price-cut label L1 describing "US$ 0.5 off from list price" as shown in FIG. 3, information "0.5, US$, off" is extracted by the character recognition processing as indicated by label characteristic data of No. 1 in the label characteristic table T shown in FIG. 6.

Similarly, concerning the labels L2 and L3 shown in FIGS. 4 and 5, information concerning a discount and point granting "10, %, discount" and "10, point" is extracted as indicated by label characteristic data of No. 2 and No. 3 shown in FIG. 6.

The benefit information refers to information obtained by converting information concerning a benefit such as price-cut information and point granting information read from the benefit indication label into alphanumerical values such that the information can be used in sales registration processing of the POS terminal 3. Specifically, as shown in FIG. 6, benefit information "−US$0.5" meaning a price cut of US$0.5 is stored in association with label characteristic data "0.5, US$, off". Benefit information "−10%" meaning a discount of 10% is stored in association with label characteristic data "10, %, discount". Benefit information "+10P" meaning point addition of 10 points is stored in association with label characteristic data "10, point".

Characteristic functions of the code reading apparatus 2 according to this embodiment are explained below. The CPU 50 operates according to the computer programs stored in the ROM 42 and expanded in the RAM 43 to function as, as shown in FIG. 2, an image-data capturing unit 51, a barcode reading unit 52, a barcode-data output unit 53, a label reading unit 54, a benefit-code output unit 55, and a notifying unit 56.

The image-data capturing unit 51 outputs an imaging ON signal to the camera controller 49 and causes the camera 20 to start an imaging operation. The image-data capturing unit 51 captures image data in an imaging area 70 imaged by the camera 20 and stores the image data in an image work area of the RAM 43. If the image-data capturing unit 51 receives an instruction of the label reading unit 54, the image-data capturing unit 51 captures image data in the imaging area 70 imaged by the camera 20 and stores the image data in the image work area of the RAM 43.

Image data D (Da, Db, and Dc) captured by the image-data capturing unit 51 are explained with reference to FIGS. 3 and 7 to 10.

As shown in FIG. 3, if the barcode 62 and the price-cut label L1 are attached close to each other on the commodity 60, the barcode 62 and the price-cut label L1 fit in the imaging area 70a. In this case, the camera 20 can image the barcode 62 and the price-cut label L1 in one frame. The image-data capturing unit 51 stores the image data Da (see FIG. 7) corresponding to the imaging area 70a in the image work area of the RAM 43.

Figure 8:
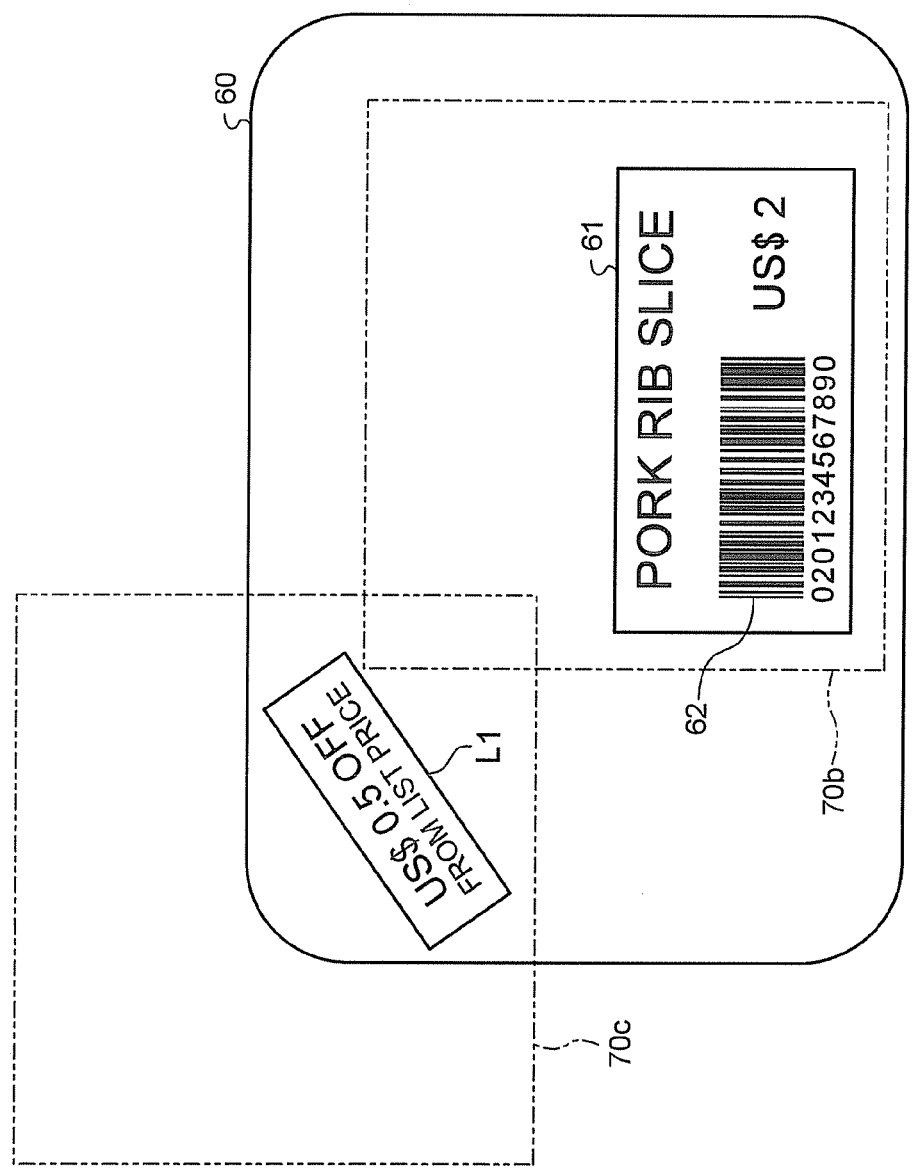
FIG. 8 is a diagram for explaining an example of a relation between the barcode and price-cut labels and an imaging area.
Figure 9:
FIG. 9 is a diagram of image data including the barcode label.
Figure 10:
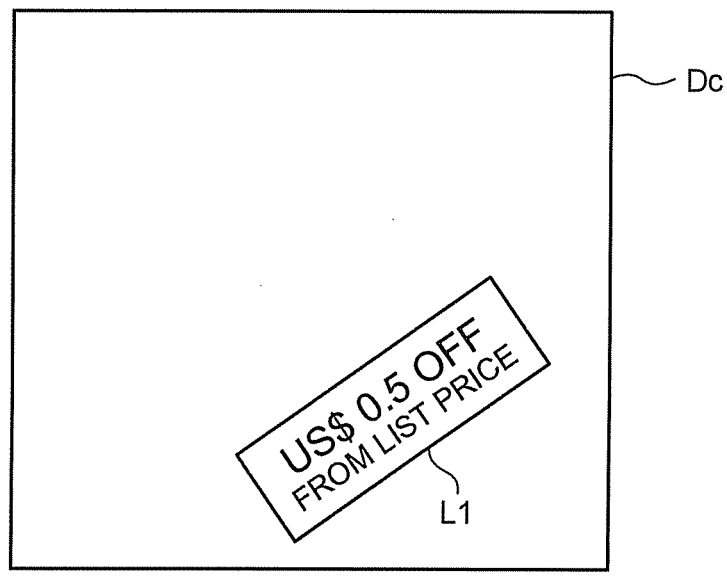
FIG. 10 is a diagram of image data including the price-cut label.

On the other hand, as shown in FIG. 8, if the barcode 62 and the price-cut label L1 are attached apart from each other on the commodity 60, the barcode 62 and the price-cut label L1 do not fit in the same imaging area 70. In this case, the operator changes the position of the commodity 60 held over the reading window 21 and images the commodity 60 plural times in plural frames of an imaging area 70b including the barcode 62 and an imaging area 70c including the price-cut label L1. The imaging-data capturing unit 51 captures the image data Db (see FIG. 9) and Dc (see FIG. 10) respectively corresponding to the imaging areas 70b and 70c and stores the image data Db and Dc in the image work area of the RAM 43.

The barcode reading unit 52 detects an image of the barcode 62 from the image data D (Da to Dc) stored in the image work area of the RAM 43 by the image-data capturing unit 51 and performs barcode reading processing for reading commodity information of the commodity 60 from the detected barcode 62.

More specifically, the barcode-reading unit 52 binarizes the image data D (Da to Dc, see FIGS. 7, 9, and 10) of one frame stored in the image work area of the RAM 43 and detects whether a data area concerning the barcode 62 is present in the binarized data. If the barcode reading unit 52 detects the data area concerning the barcode 62 in the captured image data D, the barcode reading unit 52 decodes the barcode 62 and reads barcode data C1 of J1 to J13 shown in FIG. 11 as commodity information of the commodity 60. The barcode data C1 includes a manufacturer code, a commodity code as commodity information, and a check digit. The barcode reading unit 52 stores the read barcode data C1 in a barcode work area of the RAM 43.

The barcode-data output unit 53 outputs the barcode data C1 read by the barcode reading unit 52 to the POS terminal 3 via the communication I/F 44.

The label reading unit 54 detects a benefit indication label from the image data stored in the image work area of the RAM 43 by the image-data capturing unit 51 and performs label reading processing for reading benefit information (see FIG. 6) indicated by the benefit indication label.

More specifically, the label reading unit 54 applies character recognition processing by an OCR (Optical Character Reader) or the like to the image data D (Da to Dc, see FIGS. 7, 9, and 10) of one frame stored in the image work area of the RAM 43. The label reading unit 54 collates characteristics of characters, a picture, a symbol, or the like included in the benefit indication label and label characteristic data (see FIG. 6) of the label characteristic table T. If the label reading unit 54 detects label characteristic data having a high degree of coincidence, the label reading unit 54 determines that a benefit indication label is detected in the image data D. The label reading unit 54 reads benefit information corresponding to the detected label characteristic data from the label characteristic table T (see FIG. 6), generates a benefit code C2 (see FIG. 12), and stores the benefit code C2 in a benefit code work area of the RAM 43.

FIG. 12 is a diagram for explaining the benefit code C2. As shown in FIG. 12, the benefit code C2 includes data P1 to P13 that indicate values of a benefit to be provided such as a price-cut amount, a discount rate, or the number of granted point. As an example, as shown in FIG. 3, if the price-cut label L1 for US$0.5 off is attached to the commodity 60, the label reading unit 54 reads "−US$0.5" as benefit information and generates the benefit code C2 as "−US$0.5".

The benefit-code output unit 55 outputs the benefit code C2 generated by the label reading unit 54 to the POS terminal 3 via the communication I/F 44.

If the benefit-code output unit 55 outputs the barcode data C1 to the POS terminal 3, the notifying unit 56 drives the buzzer 25, sounds a first buzzer (e.g., "beep") that indicates that the barcode label 61 is read, and turns on the display LED 24.

If the benefit-code output unit 55 outputs the benefit code C2 to the POS terminal 3, the notifying unit 56 drives the buzzer 25 and sounds a second buzzer (e.g., "beep, beep") that indicates that the benefit indication label is read.

The configuration and the functions of the POS terminal 3 according to this embodiment is explained more in detail with reference to FIG. 13.

FIG. 13 is a block diagram of a hardware configuration of the POS terminal 3. As shown in FIG. 13, the POS terminal 3 mainly includes a CPU 60, a ROM 66, a RAM 67, a HDD 68, a communication I/F 69, a keyboard controller 36, display controllers 37 and 38, and a printer controller 39. The devices are connected by a bus line 30 such as an address bus or a data bus.

The CPU 60 functions as a control unit configured to control the entire operation of the POS terminal 3. The ROM 66 has stored therein a computer program according to this embodiment and other computer programs. The RAM 67 functions as a work area when the various computer programs stored in the ROM 66 are expanded by the CPU 60. The HDD 68 stores various computer programs, sales data that indicates sales records of commodities, and various screen display data to be displayed on the store clerk display 32 and the customer display 33.

In the above explanation, the computer program according to this embodiment is stored in the ROM 66. However, a storage location of the computer program is not limited to this. The computer program may be stored in the HDD 68 or other storage devices.

The communication I/F 69 controls data communication with the code reading apparatus 2 (see FIG. 1) connected to the POS terminal 3 via a bus. The keyboard controller 36 captures a key signal from the keyboard 31. The display controllers 37 and 38 respectively control data display on the store clerk display 32 and the customer display 33. The printer controller 39 controls the printer 34 to print a receipt and the like.

Characteristic functions of the POS terminal 3 according to this embodiment are explained below. The CPU 60 operates according to the computer programs stored in the ROM 66 and expanded in the RAM 67 to function as a code receiving unit 61, a reception-code recording unit 62, and a sales registering unit 63 as shown in FIG. 13.

The code receiving unit 61 receives the barcode data C1 or the benefit code C2 from the code reading apparatus 2 via the communication I/F 69.

The reception-code recording unit 62 records the barcode data C1 or the benefit code C2 received by the code receiving unit 61 in the RAM 67 as a reception record R (see FIG. 14) in association with reception time of the barcode data C1 or the benefit code C2.

The reception record R is explained below with reference to FIG. 14. As an example, if the code receiving unit 61 receives "0201234567890", which is the barcode data C1 of a commodity, at 17:00:00, the reception-code recording unit 62 records a reception code "02012345678890" in the reception record R in association with reception time "17:00:00". If the code receiving unit 61 receives "−US$0.5", which is the benefit code C2 of the commodity, the reception-code recording unit 62 records a reception code "−US$0.5" in the reception record R in association with reception time "17:00:01".

The sales registering unit 63 performs sales registration for the commodity using the barcode data C1 or the benefit code C2 recorded in the reception record R. The sales registering unit 63 reads a commodity name, a price, and the like of the commodity corresponding to the barcode data C1 from a commodity master (not shown) stored in the HDD 68 of the POS terminal 3 or a host terminal (not shown) in a store and displays the commodity name, the price, and the like on the commodity registration screen (not shown) of the store clerk display 32. The sales registering unit 63 displays benefit information such as a price cut, point granting, or the like indicated by the benefit code C2 on the commodity registration screen.

The sales registering unit 63 determines, on the basis of the reception time of the benefit code C2 and the reception time of the barcode data C1, the barcode data C1 to which a benefit indicated by the benefit code C2 is applied and applies the benefit to the barcode data C1.

Specifically, the sales registering unit 63 determines that the barcode data C1 read at a minimum time difference from the reception time of the benefit code C2 by the code reading apparatus 2 is the barcode data C1 to which the benefit is applied and applies the benefit indicated by the benefit code C2 to the barcode data C1.

Processing performed by the sales registering unit 63 is more specifically explained below with reference to the reception record R shown in FIG. 14. In an example shown in FIG. 14, a time difference between the reception time 17:00:01 of the benefit code "−US$0.5" and the reception time 17:00:00 of the barcode data "0201234567890" received immediately before the benefit code "−US$0.5" is one second. On the other hand, a time difference between the reception time of benefit code "−US$0.5" and reception time 17:00:05 of barcode data "0101234567890" read immediately after the benefit code "−US$0.5" is four seconds. Therefore, the sales registering unit 63 applies the benefit code "−US$0.5" to the barcode data "0201234567890" having the smaller time difference. The sales registering unit 63 displays on the commodity registration screen that a price cut of US$0.5 is applied to a commodity having the barcode data "0201234567890".

If the cash total key of the keyboard 31 is pressed, the sales registering unit 63 performs closing processing for one transaction, transmits sales data to a store server or the like, and clears the reception record R of the RAM 67.

Figure 15:
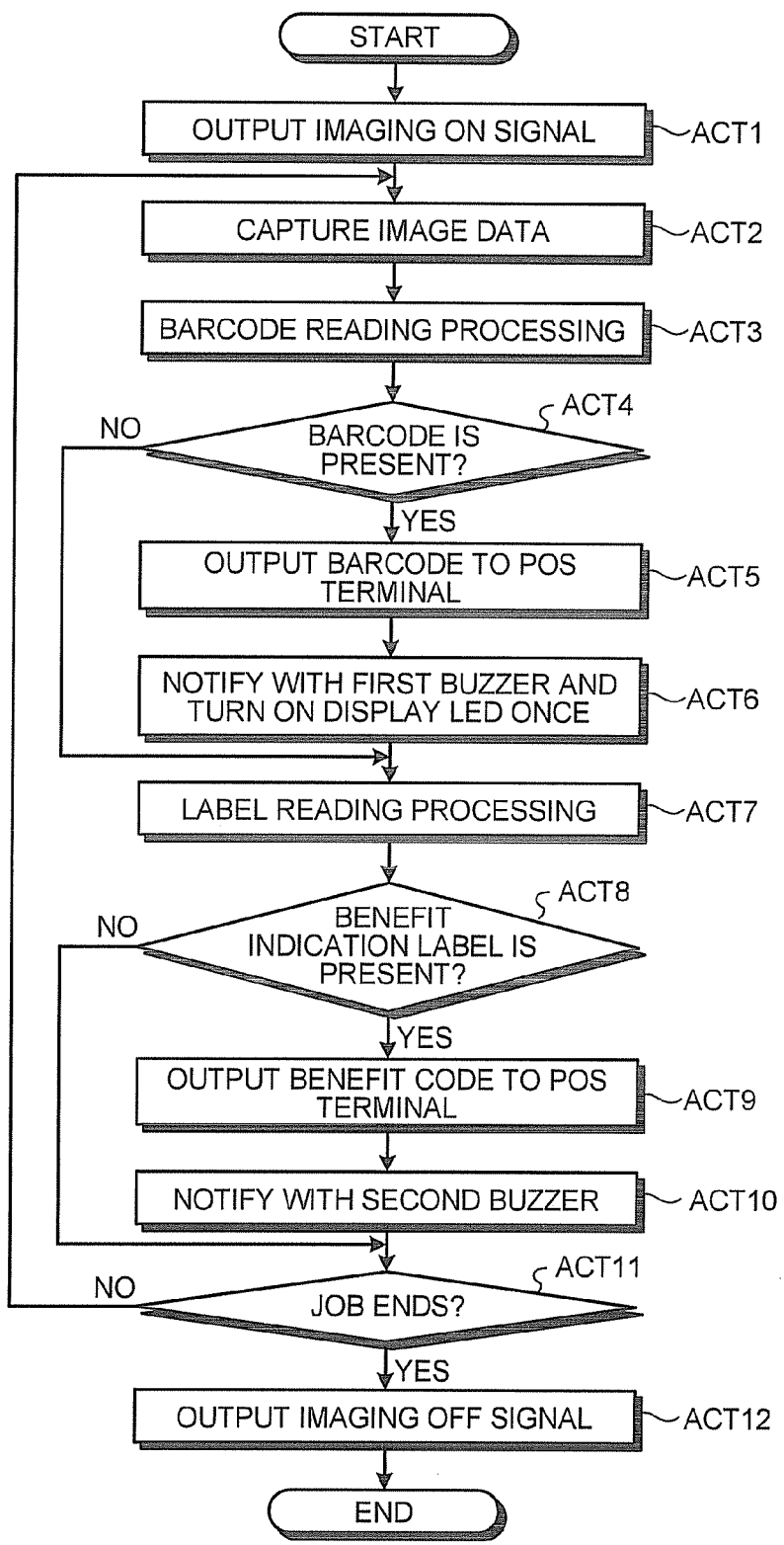
FIG. 15 is a flowchart for explaining a procedure of code output processing performed by the code reading apparatus.

Code output processing performed by the code reading apparatus 2 is explained below with reference to FIG. 15. FIG. 15 is a flowchart for explaining a procedure of the code output processing performed by the code reading apparatus 2.

When a job start is instructed by a command from the POS terminal 3, the CPU 50 of the code reading apparatus 2 starts the code output processing. The image-data capturing unit 51 outputs an imaging ON signal to the camera controller 49 and starts an imaging operation by the camera 20 (Act 1). The image-data capturing unit 51 captures the image data D (Da, Db, and Dc) imaged by the camera 20 into the image work area of the RAM 43 (Act 2). The barcode reading unit 52 starts the barcode reading processing (Act 3).

The barcode reading unit 52 determines whether the barcode 62 is detected in the barcode reading processing in Act 3 (Act 4). If the barcode 62 is not detected (No in Act 4), the CPU 50 shifts to Act 7.

If the barcode 62 is detected (Yes in Act 4), the barcode-data output unit 53 outputs the barcode data C1 (see FIG. 11) stored in the barcode work area of the RAM 43 to the POS terminal 3 (Act 5). The notifying unit 56 drives the buzzer 25, sounds a first buzzer (e.g., "beep") that indicates that the barcode label 61 is read, and turns on the display LED 24 only once (e.g., for one second once) (Act 6).

Subsequently, the label reading unit 54 starts label reading processing for the image data captured into the image work area of the RAM 43 in Act 2 (Act 7). The label reading unit 54 determines whether a benefit indication label is detected in the label reading processing in Act 7 (Act 8). If a benefit indication label is not detected (No in Act 8), the CPU 50 shifts to Act 11.

On the other hand, if a benefit indication label is detected (Yes in Act 8), the benefit-code output unit 55 outputs the benefit code C2 (see FIG. 12) stored in the benefit code work area of the RAM 43 to the POS terminal 3 (Act 9). The notifying unit 56 drives the buzzer 25 and sounds a second buzzer (e.g., "beep, beep") that indicates that the benefit indication label is read (Act 10).

Thereafter, the CPU 50 determines whether a job end is instructed by a command from the POS terminal 3 (Act 11). If the job end is not instructed (No in Act 11), the CPU 50 returns to Act 2 and repeats Acts 2 to 13 until reading processing for all commodities ends. If the job end is instructed (Yes in Act 11), the CPU 50 outputs an imaging OFF signal to the camera controller 49 (Act 12) and ends the imaging operation by the camera 20.

Figure 16:
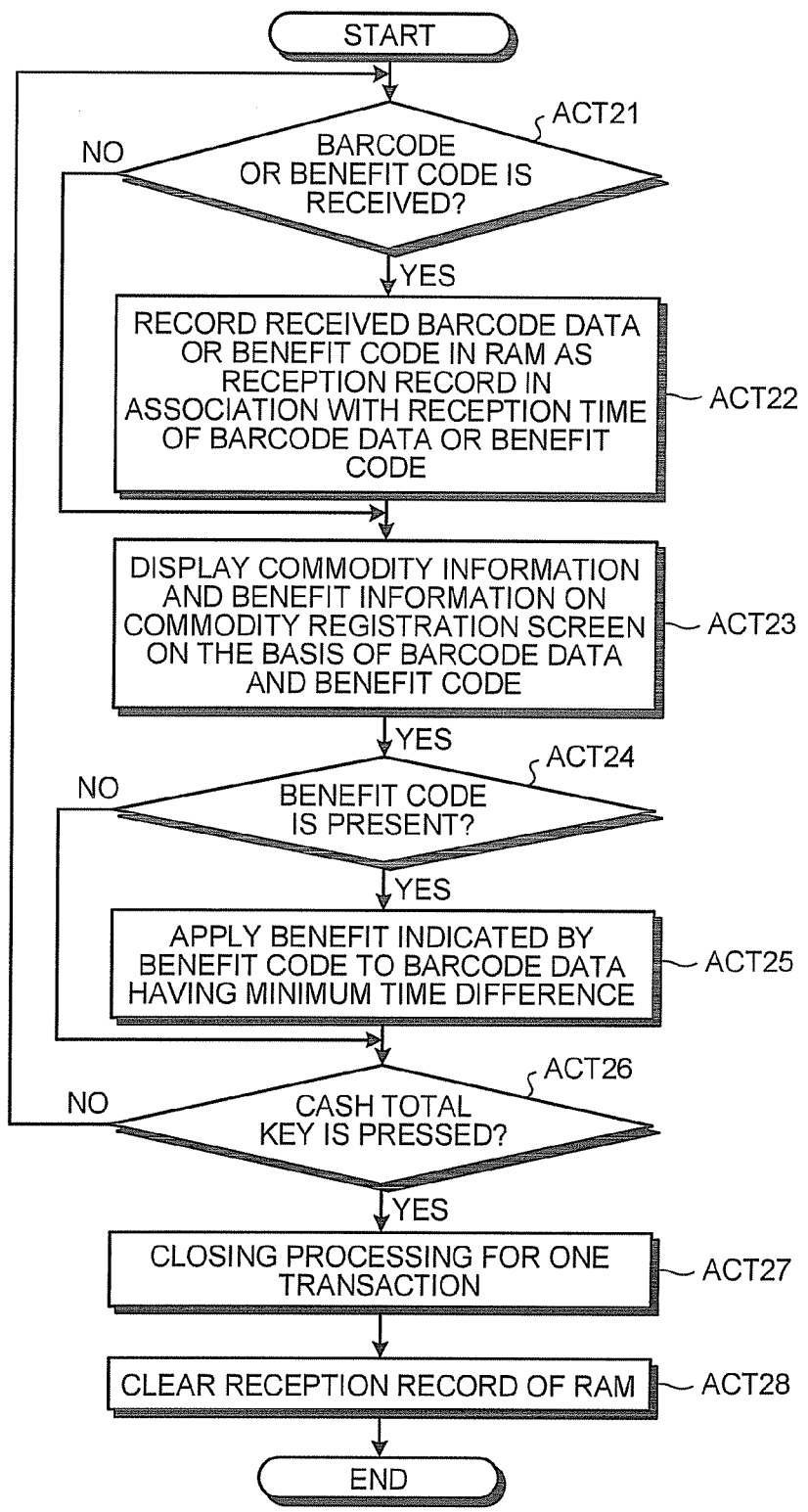
FIG. 16 is a flowchart of a procedure of sales registration processing performed by the POS terminal.

Sales registration processing for a commodity performed by the POS terminal 3 is explained below with reference to FIG. 16. FIG. 16 is a flowchart for explaining a procedure of the sales registration processing performed by the POS terminal 3.

When the sales registration processing is started, the CPU 60 of the POS terminal 3 determines whether the code receiving unit 61 receives the barcode data C1 or the benefit code C2 from the code reading apparatus 2. If the code receiving unit 61 does not receive the barcode data C1 or the benefit code C2 (No in Act 21), the CPU 60 shifts to Act 24. If the code receiving unit 61 receives the barcode data C1 or the benefit code C2 (Yes in Act 21), the CPU 60 shifts to Act 22. The reception-code recording unit 62 records the barcode data C1 or the benefit code C2 received by the code receiving unit 61 in the RAM 67 as the reception record R (see FIG. 14) in association with reception time of the barcode data C1 or the benefit code C2 (Act 22).

The sales registering unit 63 reads a commodity name and a price of a commodity corresponding to the barcode data C1 from the commodity master and displays the commodity name and the price on the commodity registration screen of the store clerk display 32 (Act 23). The sales registering unit 63 displays benefit information such as a price cut or point granting indicated by the benefit code C2 on the commodity registration screen (Act 23).

The sales registering unit 63 performs, with the reception of the benefit code C2 as a trigger, determination of the barcode data C1 to which the benefit code C2 is applied. Specifically, the sales registering unit 63 receives the benefit code C2 and determines whether the benefit code C2 is recorded in the reception record R (see FIG. 14) of the RAM 67 (Act 24). If the benefit code C2 is not received (No in Act 24), the CPU 60 shifts to Act 26.

On the other hand, if the benefit code C2 is received and recorded in the reception record R (Yes in Act 24), the CPU 60 shifts to Act 25. The sales registering unit 63 applies a benefit indicated by the benefit code C2 to the barcode data C1 read at a minimum time difference from the reception time of the benefit code C2 by the code reading apparatus 2 (Act 25).

Subsequently, the sales registering unit 63 determines whether the cash total key of the keyboard 31 is pressed (Act 26). If the cash total key is not pressed (No in Act 26), the CPU 60 returns to Act 21 and continues the processing in Acts 21 to 27. If the cash total key is pressed (Yes in Act 26), the CPU 60 performs closing processing for one transaction and transmits sales data to the store server or the like (Act 27). The sales registering unit 63 clears the reception record R of the RAM 67 (Act 28) and ends the sales registration processing concerning the one transaction.

As explained above, the code reading apparatus 2 according to the first embodiment reads the barcode data C1 from the image data D, reads benefit information, generates the benefit code C2, and outputs the codes to the POS terminal 3. Consequently, the POS terminal 3 can perform benefit granting processing for the commodity according to the received barcode data C1 and benefit code C2. Therefore, there is an effect that it is possible to automatically perform the benefit granting processing such as price-cut processing or point granting processing without requiring processing operation by the operator.

In the code reading apparatus 2, in general, a time difference required for reading plural labels attached to the same commodity 60 is short compared with a time difference required for reading labels attached to other commodities. On the other hand, as explained above, the POS terminal 3 according to this embodiment determines, on the basis of a time difference of reception time, the barcode data C1 to which a benefit is applied. Consequently, even if attached positions of the barcode 62 and a benefit indication label are apart from each other, it is possible to automatically perform the benefit granting processing with the barcode data C1 and the benefit code C2 appropriately associated.

As explained above, the notifying unit 56 notifies the operator by changing a tone and the number of times of a buzzer when the barcode label 61 is read and when the benefit indication label is read. Therefore, the operator can easily discriminate, according to the difference in the buzzer, whether the benefit indication label is read. When benefit granting such as price-cut processing or point addition is automatically performed by the POS terminal 3, the operator can easily perform check work.

In the above explanation, after the barcode reading unit 52 reads the commodity information (the barcode data C1) from the barcode 62, the label reading unit 54 reads the benefit information from the benefit indication label. However, the order of reading information is not limited to this. As another example, it is also possible that, after the label reading unit 54 reads the benefit information from the benefit indication label, the barcode reading unit 52 reads the commodity information from the barcode 62. Consequently, when the operator images the barcode 62 and the price-cut label L1, the operator may image whichever of the barcode 62 and the price-cut label L1 earlier. Therefore, the operator can more smoothly perform reading operation.

In the example explained above, one benefit indication label is attached to the commodity 60. However, plural benefit indication labels may be attached to the commodity 60. Specifically, if the POS terminal 3 receives plural benefit codes C2 within a predetermined time difference (e.g., 0.5 seconds), the POS terminal 3 may handle the benefit codes C2 as a set of benefit codes and apply benefits indicated by the benefit codes C2 to the barcode data C1 having a smaller time difference of the barcode data C1 before and after the benefit code.

In the above explanation, the barcode reading unit 52 reads the barcode 62 attached to the commodity 60. However, a code read by the barcode reading unit 52 is not limited to this. The barcode reading unit 52 may read a two-dimensional code such as a code symbol. In the above explanation, the barcode 62 is attached to the commodity 60 by the barcode label 61. However, the barcode 62 may be directly printed on the commodity 60.

In the above explanation, the label reading unit 54 reads the benefit information from the benefit indication label. However, information such as a price cut and a discount is not limited to a form of printing on a label. As another example, the label reading unit 54 may read benefit information directly described or printed on the commodity 60 or may read benefit information displayed on a coupon or the like. The label reading unit 54 is not limited to processing for identifying character information. The label reading unit 54 may identify a color, size, shape, or the like of a label, a figure, or the like and read benefit information associated with the characters.

In the above explanation, the barcode data C1 is read from the image data D imaged by the camera 20. However, a method of reading a barcode is not limited to this. As another example, the barcode 62 may be scanned by an optical scanner such as a hand scanner to read the barcode data C1.

The sales registering unit 63 determines that the benefit code C2 is applied to the barcode data C1 read at a minimum time difference from the reception time of the benefit code C2. However, a method of determining an application target is not limited to this. As another example, it is also possible that store clerks are made fully informed in advance to read a barcode earlier and the benefit code C2 is applied to the barcode data C1 read immediately before the benefit code C2 by the sales registering unit 63.

Alternatively, the sales registering unit 63 may apply the benefit code C2 to the barcode data C1 read by the code reading apparatus 2 immediately after the benefit code C2. In this case, it is advisable that the code reading apparatus 2 is configured to read a benefit indication label earlier. Specifically, it is advisable that, in FIG. 15, the code reading apparatus 2 is configured to perform the label reading processing in Act 7 prior to the barcode reading processing in Act 3.

If the reception time of the benefit code C2 and reception time of the barcode data C1 before and after the benefit code C2 exceed predetermined time set in advance, the sales registering unit 63 may perform processing for invalidating the benefit code C2. Consequently, if the benefit code C2 is received at unnatural timing, it is possible to automatically exclude the benefit code C2.

Second Embodiment

Figure 17:
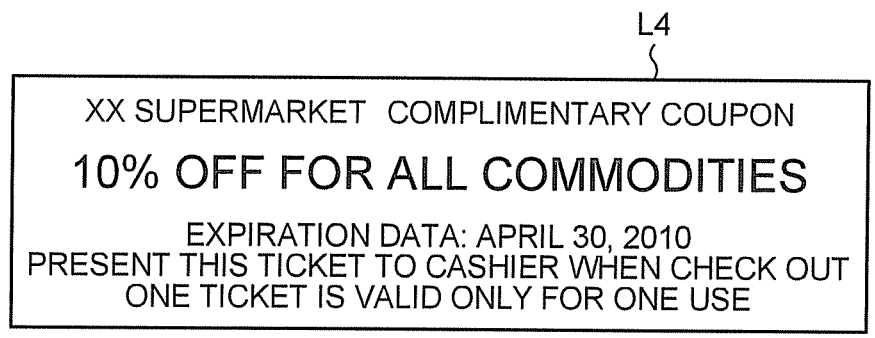
FIG. 17 is a front view of an example of a coupon.

In the past, in a store such as a supermarket, in some cases, as a complimentary benefit for a client, a coupon L4 for enabling price cuts for all commodities purchased in one transaction is distributed. As shown in FIG. 17, the coupon L4 shows benefit indication that, when the coupon L4 is presented during checkout, "10% discount for all commodities" is applied to all commodities purchased in one checkout. In this embodiment, if such a coupon L4 is read in the code reading apparatus 2, the POS terminal 3 collectively applies the benefit to all commodities purchased in one transaction.

In the code reading apparatus 2, when the coupon L4 is scanned by the camera 20, the label reading unit 54 reads the benefit indication from the coupon L4 and generates the benefit code C2 as "ALL −10%". A code "ALL" included in the benefit code C2 is a code that indicates that a 10% discount is applied to all commodities. The benefit-code output unit 55 outputs the generated benefit code C2 to the POS terminal 3. In this way, in this embodiment, the benefit code C2 generated and output by the code reading apparatus 2 includes a code that indicates that a benefit is applied to plural commodities.

In the POS terminal 3, if the code that indicates that a benefit is applied to plural commodities is included in the benefit code C2, the sales registering unit 63 collectively applies the benefit indicated by the benefit code C2 to all the target commodities. For example, if the benefit code C2 is "ALL −10%" and the code "ALL" that indicates that the 10% discount is applied to all commodities is included in the benefit code C2, the sales registering unit 63 applies 10% discount to all the commodities.

Figure 18:
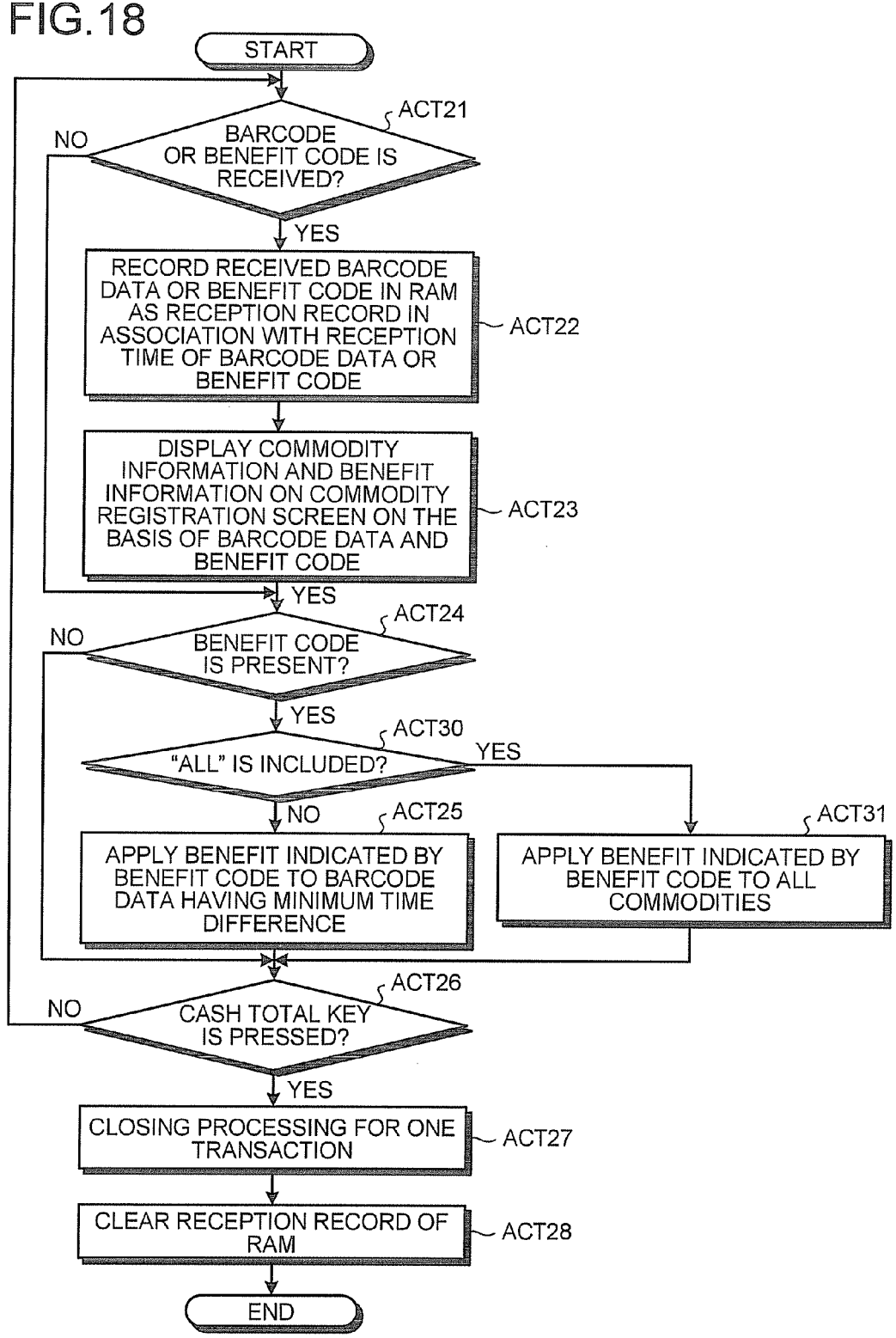
FIG. 18 is a flowchart of a procedure of sales registration processing performed by a POS terminal in a second embodiment.

Sales registration processing for a commodity performed by the POS terminal 3 in this embodiment is explained below with reference to FIG. 18. FIG. 18 is a flowchart for explaining a procedure of the sales registration processing performed by the POS terminal 3. The procedure explained with reference to FIG. 16 is not explained below.

The sales registering unit 63 discriminates whether "ALL" is included in the benefit code (Act 30). If "ALL" is not included in the benefit code (No in Act 30), the CPU 60 shifts to Act 25. If "ALL" is included in the benefit code (Yes in Act 30), the CPU 60 applies a benefit (e.g., −10% indicated after ALL) indicated by the benefit code C2 to all commodities (Act 31).

As explained above, according to the second embodiment, there is an effect that a store clerk can easily apply a benefit to plural commodities by holding a coupon or the like over the code reading apparatus 2.

Third Embodiment

Examples of main commodities to be subjected to a price cut include perishables processed and sold in a store. For the commodities processed and sold in the store, in general, an in-store code starting with a specific numerical value (e.g., C2) is used as the barcode data C1. Specifically, as shown in FIG. 3, if a barcode is "0201234567890" that starts with "02", it can be said that the barcode is an in-store code. The POS terminal 3 according to this embodiment applies the benefit code C2 to only the barcode data C1 that is the in-store code.

In the POS terminal 3, the sales registering unit 63 applies the benefit code C2 to only the barcode data C1, i.e., the in-store code, of a target commodity to which a benefit indicated by benefit indication can be applied.

As an example, referring to the reception record R shown in FIG. 14, the barcode data "0201234567890" read immediately before the benefit code "−U$0.5" is an in-store code because the barcode data starts with "02". The barcode data "0101234567890" read immediately after the benefit code "−US$0.5" is not an in-store code because the barcode data does not start with "02". In this way, if at least one of the barcode data C1 read immediately before and after the benefit code C2 is not an in-store code, the sales registering unit 63 applies a benefit indicated by the benefit code C2 to the barcode data C1 that is the in-store code.

If both the barcode data C1 read immediately before and after the benefit code C2 are not in-store codes, the sales registering unit 63 determines that both commodities having the barcode data C1 are not benefit target commodities and does not apply the benefit indicated by the benefit code C2 to both the barcode data C1.

If both the barcode data C1 read immediately before and after the benefit code C2 are in-store codes, as in the first embodiment, the sales registering unit 63 selects, on the basis of the time difference of reading time, the barcode data C1 to which the benefit is applied.

Figure 19:
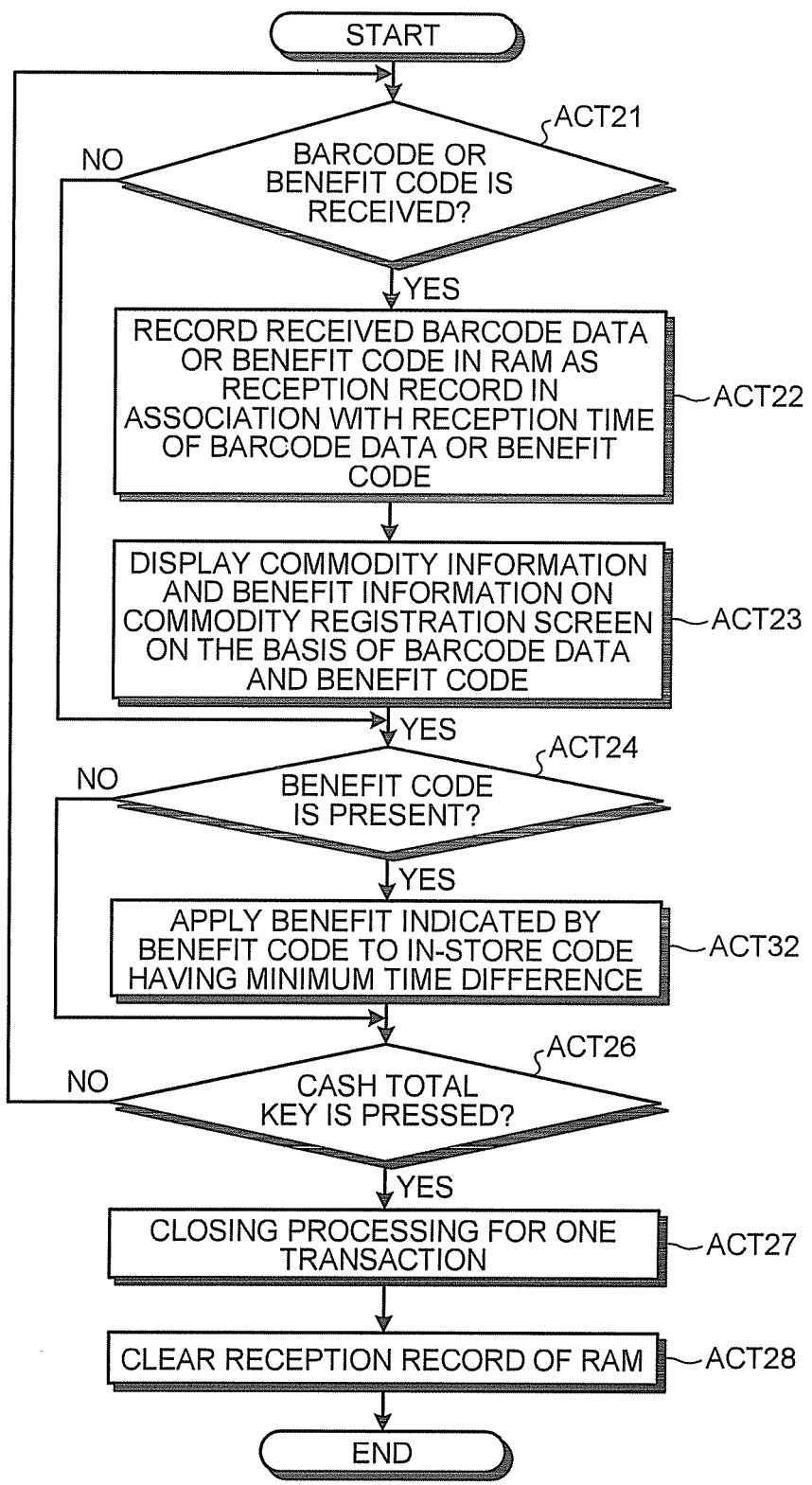
FIG. 19 is a flowchart for explaining a procedure of sales registration processing performed by a POS terminal in a third embodiment.

Sale registration processing performed by the POS terminal 3 is explained with reference to FIG. 19. FIG. 19 is a flowchart for explaining a procedure of the sales registration processing performed by the POS terminal 3. The procedure explained with reference to FIG. 16 is not explained below.

In Act 32, the sales registering unit 63 applies a benefit indicated by the benefit code C2 to the in-store code (the barcode data C1) read at a minimum time difference from the reception time of the benefit code C2.

As explained above, the POS terminal 3 according to the third embodiment applies the benefit indicated by the benefit code C2 to only an in-store code. Therefore, it is possible to prevent the benefit from being applied to a commodity other than a benefit application target by mistake.

Computer programs executed in the POS terminal 3 and the code reading apparatus 2 according to this embodiment are respectively provided while being previously incorporated in the ROM 66, the ROM 42, and the like. The computer programs executed in the POS terminal 3 and the code reading apparatus 2 according to this embodiment may be provided while being recorded on a computer-readable recording medium such as a CD-ROM, a flexible disk (FD), a CD-R, or a DVD (Digital versatile Disk) as files of an installable format or an executable format.

Further, the computer programs executed in the POS terminal 3 and the code reading apparatus 2 according to this embodiment may be stored on a computer connected to a network such as the Internet and provided while being downloaded through the network.

As explained above, with the code reading apparatuses according to the first to third embodiments, benefit information corresponding to benefit indication is read from an image of the benefit indication and output together with commodity information. Therefore, the sales registering apparatus can perform the benefit granting processing for a commodity according to the received commodity information and benefit information. Therefore, it is possible to automatically perform the benefit granting processing without requiring additional operation by the operator.

With the sales registering apparatuses and the sales registering methods according to the first to third embodiments, it is possible to perform the benefit granting processing for a commodity according to the commodity information and the benefit information received from the code reading apparatus. Therefore, it is possible to automatically perform the benefit granting processing without requiring additional operation by the operator.

The present invention is not limited to the embodiments per se. In an implementation stage, the elements can be modified and embodied without departing from the spirit of the present invention. Various inventions can be formed by appropriate combinations of the plural elements disclosed in the embodiments. For example, several elements may be deleted from all the elements disclosed in the embodiments. Further, the elements disclosed in the different embodiments may be combined.

What is claimed is:

1. A sales registering apparatus comprising:
   a receiving unit configured to receive commodity information read from a code symbol attached to a commodity and benefit information read from an image of benefit indication; and
   a sales registering unit configured to apply a benefit indicated by the benefit information to the commodity information received by the receiving unit and perform sales registration for the commodity,
   wherein the sales registering unit determines, on the basis of reception time of the benefit information and reception time of the commodity information, the commodity information to which the benefit is applied and applies the benefit to the commodity information to which the benefit is applied.

2. The apparatus according to claim 1, wherein, if the benefit information includes indication that the benefit is applied to plural commodities, the sales registering unit applies the benefit to the plural commodities to which the benefit is applied.

3. The apparatus according to claim 1, wherein the sales registering unit applies the benefit to the commodity information of a commodity to which the benefit can be applied.

4. The apparatus according to claim 1, wherein the sales registering unit applies the benefit indicated by the benefit information to the commodity information read at a minimum time difference from reception time of the benefit information.

5. The apparatus according to claim 1, wherein the sales registering unit applies the benefit indicated by the benefit information to the commodity information read immediately before the benefit information.

6. The apparatus according to claim 1, wherein the sales registering unit applies the benefit indicated by the benefit information to the commodity information read immediately after the benefit information.

7. A sales registering method performed in a sales registering apparatus, the method comprising:
   receiving commodity information read from a code symbol attached to a commodity and benefit information read from an image of benefit indication imaged by an imaging unit; and
   applying a benefit indicated by the benefit information to the received commodity information and performing sales registration for the commodity,
   wherein the applying includes determining, on the basis of reception time of the benefit information and reception time of the commodity information, the commodity information to which the benefit is applied and applying the benefit to the commodity information to which the benefit is applied.

* * * * *